(12) United States Patent
Hibbard et al.

(10) Patent No.: US 8,777,573 B2
(45) Date of Patent: Jul. 15, 2014

(54) SECTIONAL WIND TURBINE BLADE

(75) Inventors: Paul Hibbard, Singapore (SG); Mark Hancock, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 477 days.

(21) Appl. No.: 13/146,126

(22) PCT Filed: Jan. 26, 2010

(86) PCT No.: PCT/EP2010/050846
§ 371 (c)(1),
(2), (4) Date: Jul. 25, 2011

(87) PCT Pub. No.: WO2010/086297
PCT Pub. Date: Aug. 5, 2010

(65) Prior Publication Data
US 2011/0293432 A1 Dec. 1, 2011

Related U.S. Application Data

(60) Provisional application No. 61/147,580, filed on Jan. 27, 2009.

(30) Foreign Application Priority Data

Jan. 27, 2009 (DK) .................................. 2009 00131

(51) Int. Cl.
*F03D 11/00* (2006.01)
(52) U.S. Cl.
USPC ...................................... 416/132 B; 416/226

(58) Field of Classification Search
CPC .......................... F03D 1/0675; F05B 2240/302
USPC .............. 416/223 R, 226, 228, 229 R, 231 R, 416/231 B, 232, 233, 132 B, 132 R
See application file for complete search history.

(56) References Cited

U.S. PATENT DOCUMENTS 3,028,292 A * 4/1962 Hinds ........................... 156/214
4,251,309 A * 2/1981 Class et al. .................... 156/245
(Continued)

FOREIGN PATENT DOCUMENTS

DE 943 880 6/1956
FR 1 187 166 9/1959
(Continued)

OTHER PUBLICATIONS

A Areal Calama; International Preliminary Report on Patentability issued in priority International Application No. PCT/EP2010/050846; Aug. 2, 2011; 5 pages; European Patent Office.

(Continued)

*Primary Examiner* — Edward Look
*Assistant Examiner* — Eldon Brockman
(74) *Attorney, Agent, or Firm* — Wood, Herron & Evans, LLP

(57) ABSTRACT

Wind turbine blade comprising two or more blade sections each of which defines a non-joint zone and, at one or each of its ends, a joint zone. The blade sections are connected in pairs such that the joint zones of each pair are connected at a joint, whereby the joint is positioned between two non-joint zones. At least one of the joints have an increased thickness and a wider chord relative to the thickness and the chord of the two non-joint zone between which the joint is positioned so as to increase the second moment of inertia in the area of the joint.

8 Claims, 5 Drawing Sheets

(56) References Cited

U.S. PATENT DOCUMENTS

| | | | |
|---|---|---|---|
| 7,364,407 B2 * | 4/2008 | Grabau et al. | 416/229 R |
| 7,901,188 B2 * | 3/2011 | Gonzalez et al. | 416/228 |
| 7,997,874 B2 * | 8/2011 | van der Bos | 416/223 R |
| 2008/0069699 A1 * | 3/2008 | Bech | 416/229 R |
| 2008/0138206 A1 * | 6/2008 | Corren | 416/223 R |
| 2008/0145231 A1 * | 6/2008 | Gonzales et al. | 416/243 |
| 2008/0206062 A1 * | 8/2008 | Sanz Pascual et al. | 416/226 |
| 2011/0091326 A1 * | 4/2011 | Hancock | 416/225 |

FOREIGN PATENT DOCUMENTS

| | | |
|---|---|---|
| JP | 2000-64941 | 3/2000 |
| WO | 2006056584 | 6/2006 |

OTHER PUBLICATIONS

Peter Simonsen; 1st Technical Examination and Search Report issued in priority Denmark Application No. PA 2009 00131; Sep. 10, 2009; 5 pages; Denmark Patent and Trademark Office.

A. Areal Calama; International Search Report and Written Opinion issued in priority International Application No. PCT/EP2010/050846; Mar. 11, 2011; 9 pages; European Patent Office.

European Patent Office, Office Action issued in corresponding EP 10701240.3 dated Apr. 9, 2013, 4 pages.

* cited by examiner

SECTIONAL WIND TURBINE BLADE

FIELD OF THE INVENTION

The present invention relates to a wind turbine blade comprising one or more blade sections which are connected by a joint. The dimensions of both the thickness and the chord of the joint are increased in the area of the joint relative to the thickness and the chord in a non-joint part of the blade section.

BACKGROUND OF THE INVENTION

Modern wind turbines comprise a plurality of wind turbine rotor blades, typically three blades, each blade today having a weight of up to 15 tons and a length of up to 65 meters.

In order to facilitate transportation of such large blades, it is envisaged that the blades are made from a plurality of blade sections, which are assembled at the erection site of the wind turbine. The blade sections may be connected in a joint zone when the blade is assembled. However, such joints may cause the blade to be structurally weakened in the area of the joint and, thus, there is a need for reinforcing the blade this area.

In use, the joint is subjected to bending and centrifugal loading caused by the rotation of the blade. Accordingly, the joint must be designed to cope with the shear stress and normal stress caused by these types of loading. Both types of stress in the joint are dependent on the blade section thickness, thus, increasing the thickness reduces the stress e.g. due to bending.

However, from an aerodynamic point of view, it is often preferred to minimise the thickness of the blade. Accordingly, the skilled person is faced with two contradictory principles: increasing the thickness improves the strength which however is undesirable from an aerodynamic viewpoint, and reducing the thickness is desirable from an aerodynamic point of view, but this reduces the strength of the joint.

In order to address the challenge, high strength materials such as fibre glass and carbon fibre are often used to achieve the desired strength and aerodynamic profile. Such materials are often fastened to each other by means of an adhesive such as a two-component epoxy adhesive.

In the case of bolted joints, metal bolts may take the load. However, high strength steel can take less stress than carbon fibre, and just considering the static loads, the bolts need to have approximately one and a half times the cross sectional area of the carbon fibre in order to be able to take the same load. Furthermore, due to fatigue loading, metal bolts would need an even greater cross sectional area. This, however, forces the skilled person to increase the thickness of the blade which, as stated above, is undesirable.

It is an object of an embodiment of the present invention to provide a sectional blade which has an increased strength in the area of the joint.

Moreover, it is an object of an embodiment of the present invention to provide a sectional blade which minimises any reduction in the aerodynamic performance in the area of the joint.

DESCRIPTION OF THE INVENTION

Compared to conventional blades, it has been found that a slight increase of the width of the chord in the area of the joint compared to neighbouring parts of the blade, while keeping substantially the same chord-to-thickness ratio along the length of the blade, reduces the stress considerably while compromising insignificantly on the aerodynamics of the blade.

Thus in a first aspect, the present invention relates to a wind turbine blade defining a chord extending from a leading edge to a trailing edge of the wind turbine blade and a thickness extending in a direction transverse to the chord, the wind turbine blade comprising two or more blade sections each of which defines a non-joint zone and, at one or each of its ends, a joint zone;

wherein the blade sections are connected in pairs such that the joint zones of each pair are connected at a joint, whereby the joint is positioned between two non-joint zones;

wherein at least one of the joints has an increased thickness and a wider chord relative to the thickness and the chord of the two non-joint zones between which the joint is positioned so as to increase the second moment of inertia in the area of the joint.

By providing both an increased thickness and a wider chord in the area of the joint, the strength of the blade in this area is increased as the second moment of inertia in the area of the joint is larger than the second moment of inertia in a non-joint area of the blade. This reduces the stress in the joint during both stand still and operation of the wind turbine blade.

Moreover, by increasing both the chord and the thickness, the blade may be designed such that any changes in the aerodynamic properties in the region of the joint are mitigated such that any reduction in the local aerodynamic performance is acceptable.

The thickness to chord ratio (T/C-ratio) changes along the length of the blade—at the root of the blade the T/C ratio may be around 1, and at the tip of the blade, the T/C ratio may be around 0.1. In the present invention, the T/C ratio at the joint is comparable to the T/C ratio at regions of the blade adjacent to the joint, or what the T/C ratio would have been if the joint was not there. However, it is also possible that if, for example, the thickness of the joint is doubled, the chord width may only be increased by 50%—in this example, the aerodynamic profile is not maintained but the increase in the thickness/chord ratio is minimised.

In the context of the present invention, the term "chord" shall designate the distance from the leading edge to the trailing edge of the blade at any given position along the length of the blade.

Further in the context of the present invention, the term "thickness" shall designate the distance between the windward and the leeward side of the blade. Typically, the thickness will be the thickest part of the cross-section.

Moreover in the context of this invention, the 'proximal end' of the wind turbine blade shall designate the hub end, and the 'distal end' of the wind turbine blade shall designate the tip.

Additionally in the context of the present invention, the term "length" of the blade shall designate the direction from the hub to the tip. Dimensions in this direction may in this invention be said to be shorter or longer.

Furthermore, the term "width" shall designate the direction from the leading edge to the trailing edge, i.e. the direction of chord of the blade. Dimensions in this direction may in this invention be said to be wider or narrower.

Additionally, the term "thickness" of the blade shall designate the direction extending between the windward and the leeward side of the blade, i.e. a direction transverse to the chord. Dimensions in this direction may in this invention be said to be thicker or thinner.

The wind turbine blade comprises a plurality of blade sections such as two, three, four, five, six or any other number. Each of the blade sections defines at least one joint zone for attachment of the blade section to another blade section. Generally the blade sections can be divided into three categories each of which defines at least one non-joint zone and at least one joint zone:

The first category comprises the tip blade section which defines the tip of the blade. The tip blade section defines—as seen from the tip of the blade and towards the hub: a tip, a non-joint zone and a joint zone.

The second category comprises the hub blade section which defines the hub end of the blade. The hub blade section defines—as seen from the tip of the blade and towards the hub: a joint zone, a non-joint zone and a hub end.

The third category comprises the intermediate blade section(s) which, in the assembled blade, is/are positioned between the hub blade section and the tip blade section. Each intermediate section defines—as seen from the tip of the blade and towards the hub: a distal joint zone, a non-joint zone, and a proximal joint zone.

It will be appreciated that any blade comprising the structure of the present invention comprises one hub blade section, one tip blade section and between zero and a plurality of intermediate blade sections.

It will be appreciated that the larger the number of blade sections is, the easier it will be to transport the blade prior to assembly.

Further, the blade sections are connected in pairs such that the joint zones of each pair are connected in a joint. The joint zones may be connected in a permanent or non-permanent manner. Examples of permanent connections are welding and adhesive, and examples of non-permanent connections are bolts and nuts. When the blade sections are connected to each other, the joint is defined between the two joint zones. Moreover, the joint and the two joint zones are defined between the two non-joint zones.

Each of the blade sections may be reinforced by means of a spar section which extends inside the blade section in the longitudinal direction thereof. Each of the spars may define two opposing webs which are interconnected by means of two opposing caps. The caps extend in a direction parallel to the chord and the webs extend in a direction parallel to the thickness of the blade.

Each spar section may define at least one fastening end which is adapted to be connected/fastened/attached to a corresponding fastening end of another spar section, so as to connect two blade sections to each other. When the blade is assembled, the fastening ends of the spar sections may be connected in pairs such that the fastening ends of each pair define at least a part of the joint.

In one embodiment, at least one spar section has an increased thickness (i.e. the dimension of the webs of the spar) and/or an increased width (i.e. the dimension of the caps of the spar) in the area of the fastening end relative to the thickness and the width of a non-fastening end part of the spar section. By increasing the width and/or the thickness, the second moment of inertia is increased and thus the stress in the area of the fastening end may be reduced.

This is especially useful when bolts are used to fasten the two fastening ends together, as even high strength steel has a lower material strength relative to carbon fibre laminate. Whereas carbon fibre laminate has a material strength of 1750 MPa, high strength steel has a material strength of 1200 MPa. Accordingly, increasing the dimensions of the fastening ends makes the use of metal bolts more feasible.

The geometrical shape of a cross-section of the wind turbine blade and/or the spar section in the area of at least one of the joints may be substantially identical to the geometrical shape of a cross-section at any other point along the length of the wind turbine blade and/or the spar section. By substantially identical is meant that the outline of either of the two cross-sections may be scaled to coincide with the outline of the other of the two cross-sections.

In one embodiment, a first, of the two joint zones of each joint, defines a distal zone and a second, of the two joint zones of each joint, defines a proximal zone relative to a hub of the wind turbine blade. Moreover, in this embodiment:
   the width of the chord in the area of the distal zone may increase in the direction of the hub of the wind turbine blade;
   the width of the chord in the area of the non-joint zones may increase in the direction of the hub of the wind turbine blade; and
   the width of the chord in the area of the proximal zone may decrease in the direction of the hub of the wind turbine blade.

The width of the chord may be 5 percent larger in at least one cross-section of the joint zone relative to the width of the chord in a transition between the joint zone and one of the non-joint zones. In other embodiments, the width of the chord in the joint zone is between 10 percent larger and 20 percent larger than the width of the chord in a transition between the joint zone and one of the non-joint zones.

The thickness may be 5 percent larger in at least one cross-section of the joint zone relative to the thickness in a transition between the joint zone and one of the non-joint zones. In other embodiments, the thickness may be between 10 and 20 percent larger.

In a second aspect, the present invention relates to a wind turbine having a rotor comprising at least two wind turbine blades according to the first aspect of the invention. It will be appreciated that the blades of the wind turbine may comprise any combination of features and elements of the first aspect of the invention.

DESCRIPTION OF THE FIGURES

Examples of the invention will now be described with reference to the figures in which:

FIGS. 1 and 2 each disclose a wind turbine blade 100 comprising a plurality of blade sections 102, 104, 106. In the embodiment of FIG. 2, the wind turbine blade 100 comprises a hub blade section 102, an intermediate blade section 104, and a tip blade section 106. In the embodiment of FIG. 1, the wind turbine blade 100 comprises one hub blade section 102, and one tip blade section 106. The hub blade section 102 defines a hub end 108, and the tip blade section 106 defines a tip 110. The hub end 108 is adapted to be attached/fastened/secured to the hub of a wind turbine (not shown).

Figure 1:
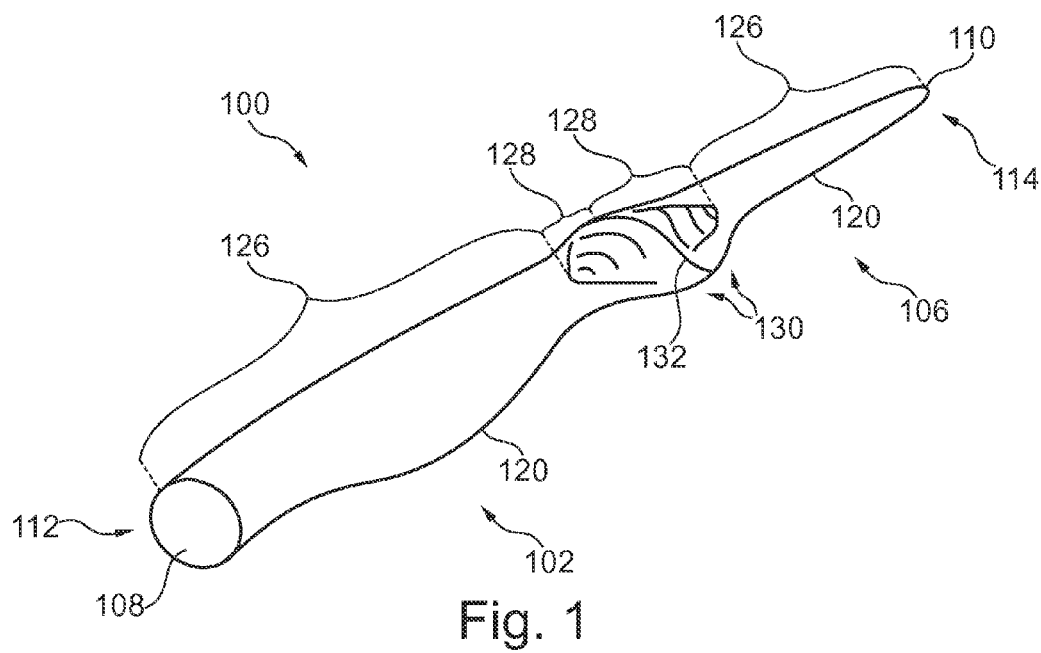
FIGS. 1 and 2 disclose a blade with two and three blade sections, respectively, FIG. 3 discloses a cross-section of the wind turbine blade in the area of a joint and in the area of a non-joint zone, FIGS. 4 and 5 disclose spar sections of a blade, FIGS. 6 and 7 disclose spar sections with increased thickness in the area of the joint, and FIGS. 8-10 disclose alternative ways of fastening the blade sections to each other.

In the context of this invention the 'proximal end 112' of the wind turbine blade 100 designates the hub end 108, and the 'distal end 114' of the wind turbine blade 100 shall designate the tip 110. Similarly, the term 'proximal direction' designates a direction towards the proximal end 112 (and, thus, also the hub end 108). Additionally, the term 'distal direction' designates a direction towards the distal end 114 (and thus also the tip 110).

Figure 3:
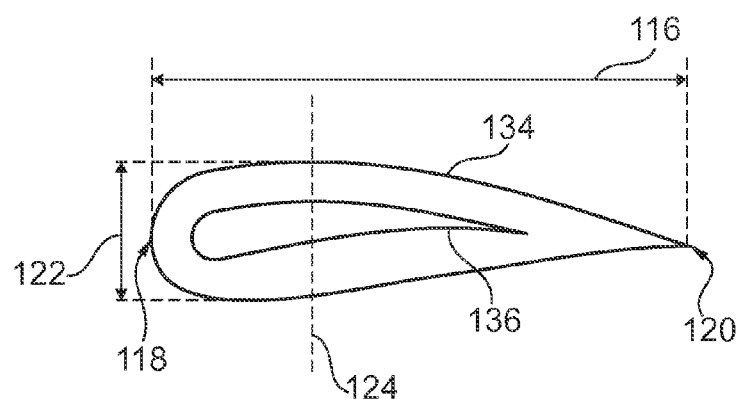

Each of the blade sections 102, 104, 106 define a chord 116 extending from a leading edge 118 to a trailing edge 120 of the blade, see FIG. 3 which discloses a cross-section of one of blade sections in a plane defining a right angle with a line extending from the hub end 108 to the tip 110. Moreover, each of the blade sections 102, 104, 106 define a thickness 122 extending in a direction 124 transverse to the chord 116, e.g. such that the direction 124 and the chord 116 defines a right angle. In some embodiments, the thickness 122 may be the thickest part of the cross-section.

Figure 2:
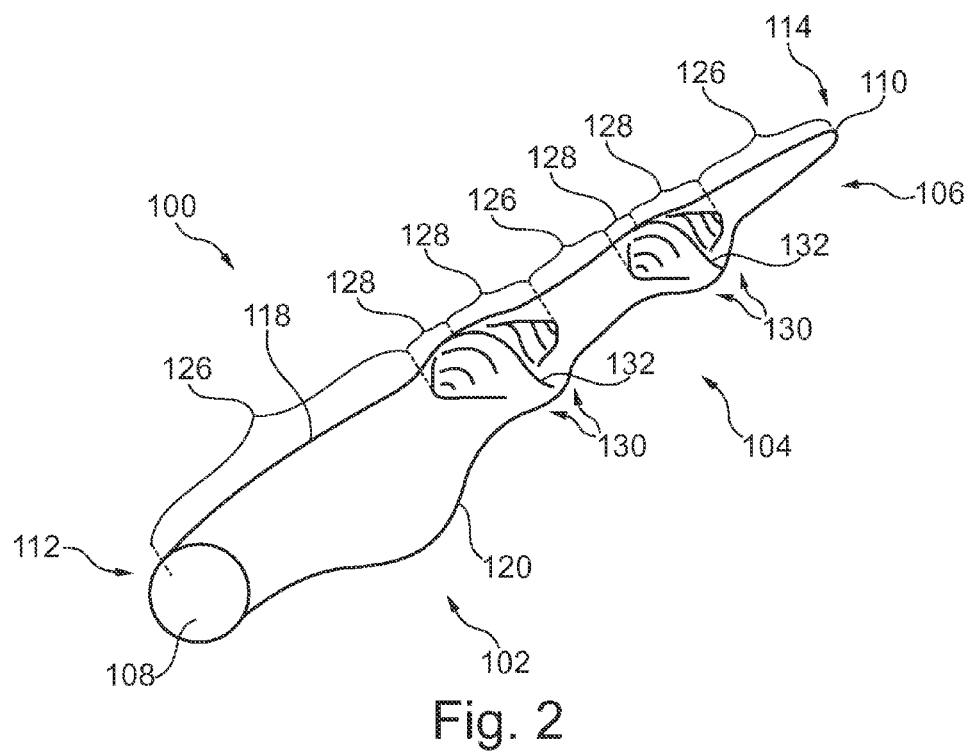
Figure 7:
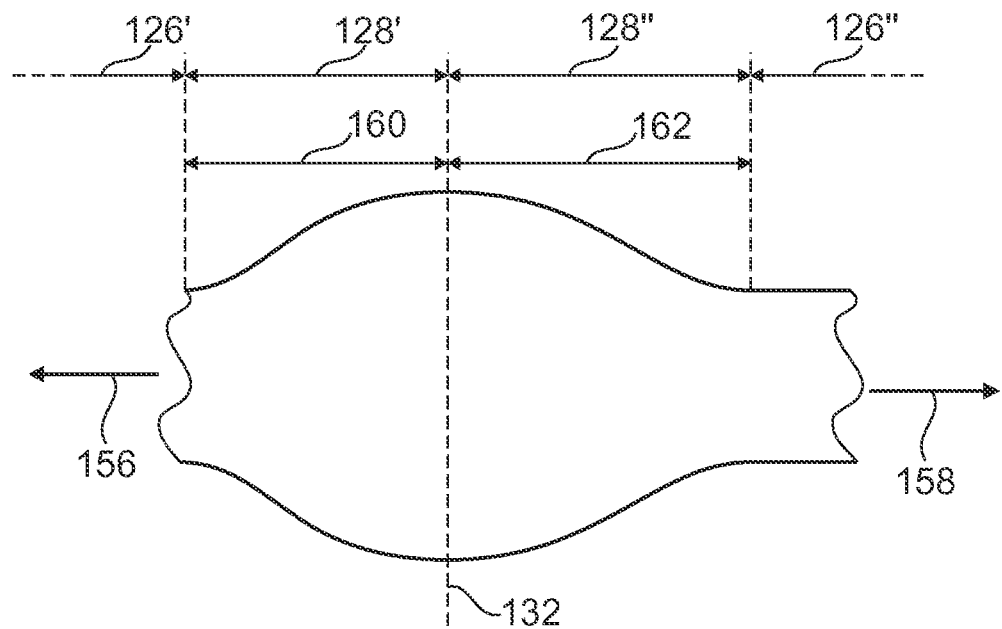

Each of the blade sections 102, 104, 106 define a non-joint zone 126 and, at one or each of its ends, a joint zone 128, see FIG. 7. In the embodiment of FIG. 2, the hub blade section 102 comprises one non-joint zone 126, one joint zone 128 and one hub end 108. Moreover, the intermediate blade section 104 comprises two joint zones 128 and one non-joint zone 126 interposed there between. Finally, the tip blade section 106 comprises one non-joint zone 126, one joint zone 128 and one tip 110.

The blade sections 102, 104, 106 are connected in pairs 130 such that the joint zone 128 of each pair 130 are connected at a joint 132. Accordingly, it will be appreciated that each joint 132 is defined between two joint zones 128.

Each joint 132 has an increased thickness 122 and a wider chord 116 relative to a predetermined cross-section at each of the two non-joint zones 126 between which the respective joint 132 is interposed. It will be appreciated that by providing a wider chord 116 and an increased thickness 122, the second moment of inertia of the joint 132 is increased compared to the second moment of inertia at the predetermined cross-section. In one embodiment, the predetermined position of each of the two non-joint zones 126 is the position at which the respective non-joint zone 126 has its shortest chord 116 and/or its smallest thickness 122.

FIG. 3. discloses two geometrical shapes 134,136—a joint geometrical shape 134 and a non-joint geometrical shape 136. The joint geometrical shape 134 corresponds to the geometrical shape of a cross-section of the blade in the area of at least one of the joints 132 of a wind turbine blade 100. The non-joint geometrical shape 136 corresponds to the geometrical shape of a cross-section in the area of at least one of the non-joint zones 126 adjacent to the joint. The thickness-to-chord ratios of the geometrical shape 134 and the non-joint geometrical shape 136 are substantially the same, and the outline of the two cross-sections have substantially the same geometrical shape, i.e. if one of geometries can be scaled such that it coincides with the other of the geometries.

It will be appreciated that by providing the substantially same geometrical shape, the aerodynamic characteristic of the blade is substantially identical in the region of the joint compared to a region adjacent to the joint. The lift force generated will be larger for the section of the blade with the larger chord; but, by keeping the thickness to chord ratio in the area of the joint substantially the same, will keep a similar lift coefficient CL.

Figure 4:
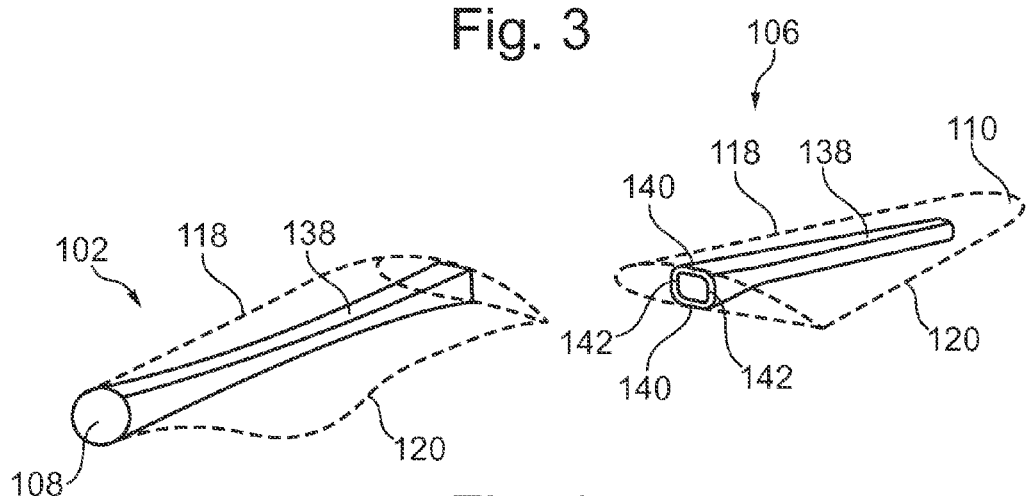

FIG. 4 discloses two blade sections 102, 106, the outer surfaces of which are indicated by means of a dotted line. The blade sections 102, 106 each comprise a spar section 138 for reinforcing the blade. The spar section 138 comprises two opposing caps 140 which are interconnected by means of two opposing webs 142.

Due to the increased thickness 122 and the wider chord 116 in the area of the joint 132, the dimensions of the caps 140 and webs 142 may be increased similarly. Accordingly, the caps 140 may be wider (i.e. have an increased dimension in the direction of the chord 116) and the webs 142 may be thicker (i.e. have an increased dimension in the direction of the thickness 122).

FIG. 4 discloses blade sections 102,106 in which the spar sections 138 do not have a uniform dimension along the length of the blade. In the case of the hub blade section 102, the spar section 138 is narrower and thinner in the non-joint zone 128 than at the hub end 108 and the joint 130.

Figure 5:
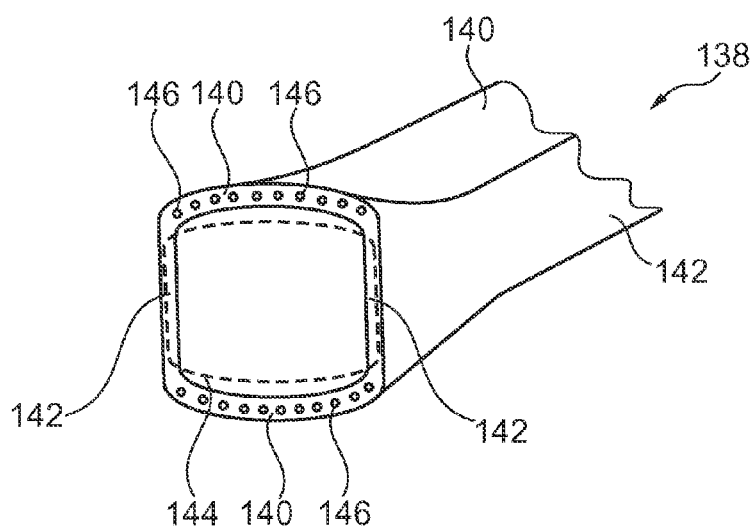

In other embodiments, only one of the spar sections 138 and the webs 142 have an increased dimension in the area of the joint 132. This is illustrated in FIG. 5 in which a cross-section 144 of the spar section 138 in the non-joint zone 126 is illustrated by means of a dotted line 144. From FIG. 5, it will be appreciated that the width of the spar section 138 is identical along the length of the spar section 138, whereas the thickness of the spar section 138 increases towards the joint 132.

Figure 6:
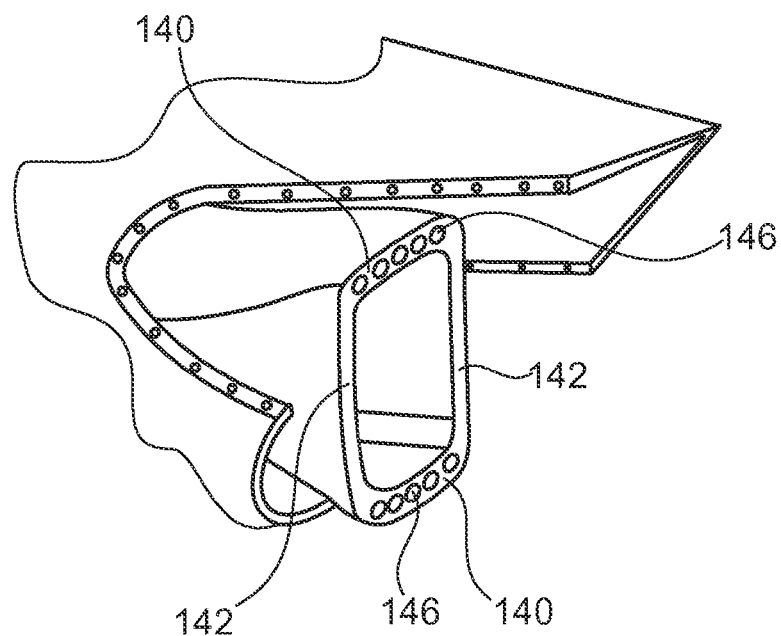

The blade sections may be fastened to each other in a plurality of different ways. One way is illustrated in FIGS. 5-6, in which passages 146 for receiving bolts 148 are provided. FIG. 7 discloses a cross-section of a joint 132 in the longitudinal direction of the blade and in a direction transverse to the chord 116. In the figure, two arrows indicate the proximal direction 156 and a distal direction 158, respectively. The figure discloses two joint zones 128',128" which are connected by a joint 132 (indicated by the dotted line). The two joint zones are positioned between two non-joint zones 126',126", a first 126' of which is positioned in the proximal direction 156 relative to the joint 132 and a second 126" of which is positioned in the distal direction 158 relative to the joint 132.

A first of the two joint zones 128' defines a proximal zone 160 and a second of the two joint zones 128" defines a distal zone 162.

As the cross-section illustrated in FIG. 7 is transverse to the longitudinal direction and the chord of the blade, the figure visualizes the thickness 122 of the blade in the area of the non-joint zones and the joint zones. The following characteristics may be seen in the figure:

the thickness 122 of the proximal zone 160 decreases in the proximal direction 156, i.e. in the direction of the hub 108, the thickness 122 of the distal zone 162 increases in the proximal direction 156, and the thickness 122 of non-joint zones 126',126" increases in the proximal direction 156.

Alternatively, or as a supplement, the blade may have the following characteristics relating to the chord 116:

the chord 116 of the proximal zone 160 decreases in the proximal direction 156, i.e. in the direction of the hub 108, the chord 116 of the distal zone 162 increases in the proximal direction 156, and the chord 116 of non-joint zones 126',126"increases in the proximal direction 156.

Figure 8:
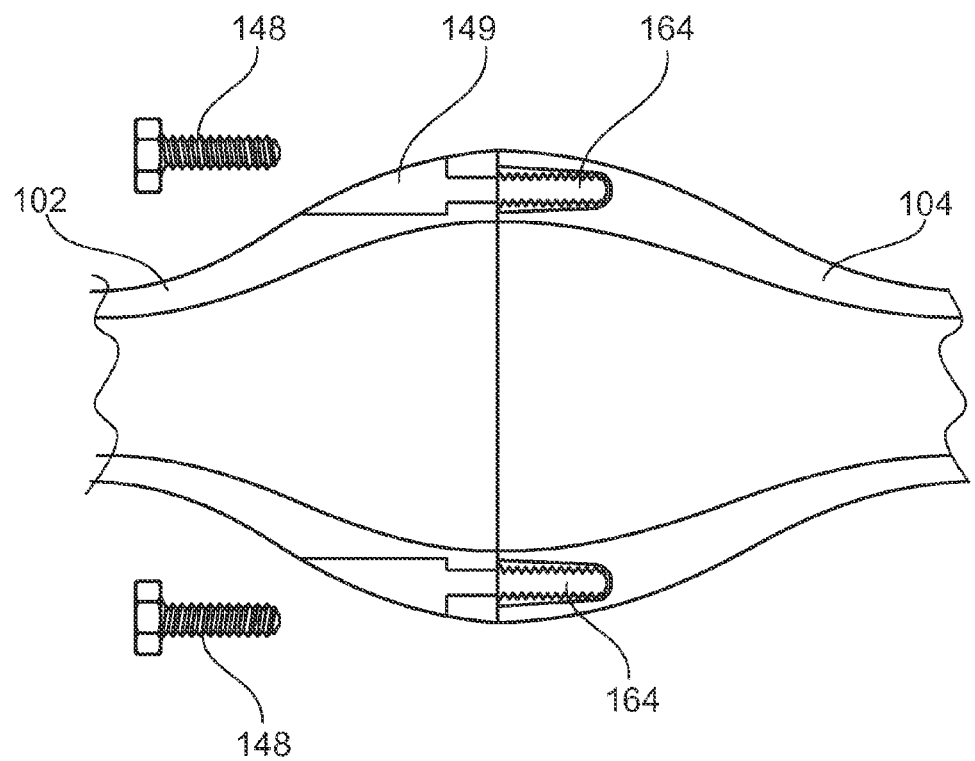
Figure 9:
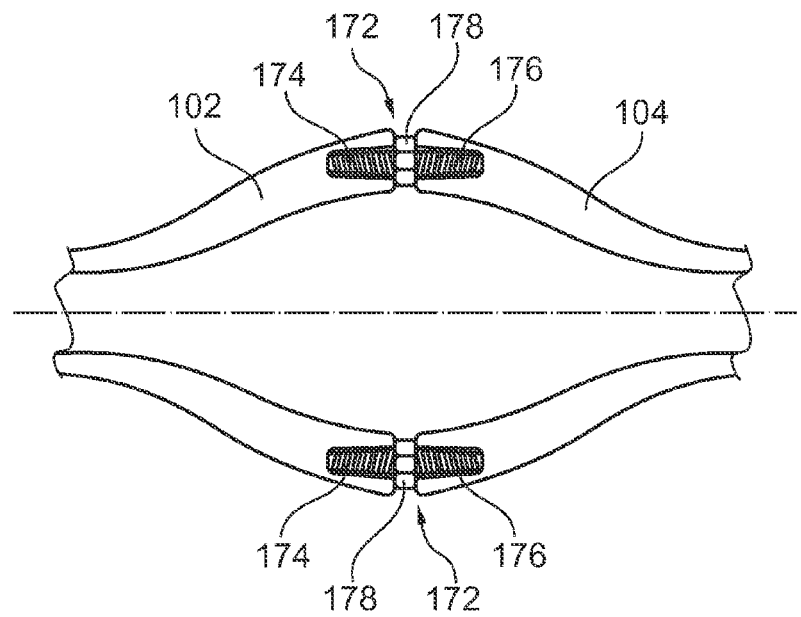
Figure 10:
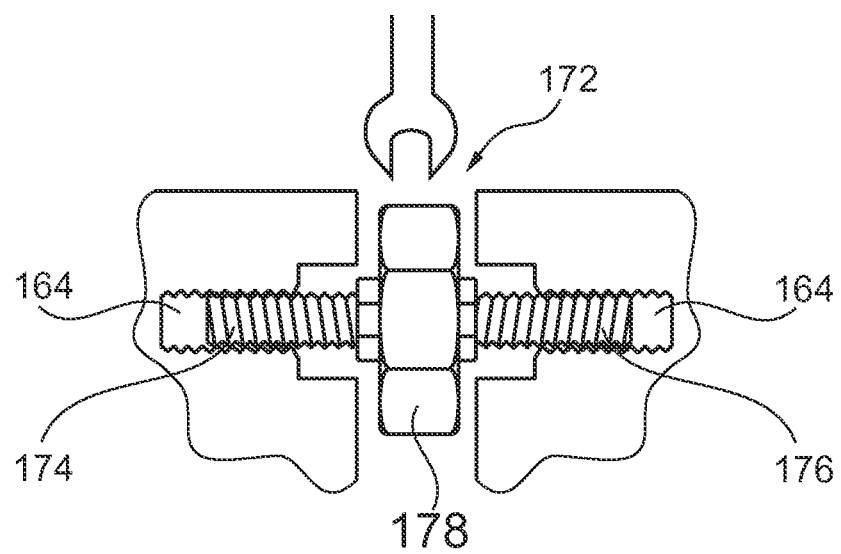

FIGS. 8-10 disclose alternative ways of fastening the blade sections to each other. In FIG. 8, one of the blade sections defines internally threaded bores 164 adapted to receive the threaded outer surfaces of the bolts 148. When the two blade sections 102,104 abut each other and the bolts 148 are screwed into the internally threaded bores 164 of the blade section 104, the blade sections 102,104 are fastened to each other. Subsequently, a cover (not shown) may be provided over the opening 149 so as so provide a smooth outer surface of the entire blade.

Finally, FIGS. 9 and 10 disclose a threaded connecting member 172 having a right-threaded part 174 and a left-threaded part 176 which are adapted to be screwed into internally threaded bore 164 (with matching threads). Due to the oppositely threaded surfaces, rotation of the member 172 in one direction causes it to be screwed into both the bores 164 and rotation in the opposite direction causes it to be screwed out of the bores 164. The member 172 comprises a hexagonally shaped member 178, adapted to be engaged by a conventional wrench so as to allow the member 172 to be rotated by means thereof.

The invention claimed is:

1. A wind turbine blade defining a chord extending from a leading edge to a trailing edge of the wind turbine blade and a thickness extending in a direction transverse to the chord, the wind turbine blade comprising:
   a first blade section having a first non-joint zone and a first joint zone at an end of the first blade section; and
   a second blade section having a second non-joint zone and a second joint zone at an end of the second blade section, wherein the first and second blade sections are connected such that the first joint zone and the second joint zone are connected at a joint, whereby the joint is positioned between the first and second non-joint zones;
   wherein the joint has an increased thickness and a wider chord relative to the thickness and the chord of the first and second non-joint zones between which the joint is positioned so as to increase the second moment of inertia in the area of the joint;
   wherein the first joint zone of the first blade section defines a distal zone relative to a hub of the wind turbine blade, and the second joint zone of the second blade section defines a proximal zone relative to the hub of the wind turbine blade;
   wherein the width of the chord in the area of the distal zone increases in a direction of the hub of the wind turbine blade;
   wherein the width of the chord in the area of the first and second non-joint zones increases in the direction of the hub of the wind turbine blade; and
   wherein the width of the chord in the area of the proximal zone decreases in the direction of the hub of the wind turbine blade.

2. The wind turbine blade according to claim 1, wherein the first blade section defines a first spar section having a first fastening end, and the second blade section defines a second spar section having a second fastening end, and wherein the first and second fastening ends of the first and second spar sections are connected in pairs such that the first and second fastening ends define at least a part of the joint.

3. The wind turbine blade according to claim 2, wherein at least one of the first and second spar sections has an increased thickness and/or an increased width in the area of the at least one of the first and second fastening ends relative to the thickness and the width of a non-fastening end part of the at least one of the first and second spar sections.

4. The wind turbine blade according to claim 1, wherein the thickness to chord ratio (T/C-ratio) of the joint is substantially the same as the thickness to chord ratio of the first and second non-joint zones between which the joint is positioned.

5. The wind turbine blade according to claim 1, wherein the geometrical shape of a cross-section of the wind turbine blade in the area of the joint is substantially the same as the geometrical shape of a cross-section of the wind turbine blade at at least one of the first and second non-joint zones.

6. The wind turbine blade according to claim 1, wherein the width of the chord is 20 percent larger in at least one cross-section of one of the first or second joint zones relative to the width of the chord in a transition between the one of the first or second joint zones and the respective first or second non-joint zone.

7. The wind turbine blade according to claim 1, wherein the thickness is 20 percent larger in at least one cross-section of one of the first or second joint zones relative to the thickness in a transition between the one of the first or second joint zones and the respective first or second non-joint zone.

8. A wind turbine comprising:
   a hub; and
   at least two wind turbine blades coupled to the hub, each of the wind turbine blades comprising:
      a first blade section having a first non-joint zone and a first joint zone at an end of the first blade section; and
      a second blade section having a second non-joint zone and a second joint zone at an end of the second blade section, wherein the first and second blade sections are connected such that the first joint zone and the second joint zone are connected at a joint, whereby the joint is positioned between the first and second non-joint zones;
   wherein the joint has an increased thickness and a wider chord relative to the thickness and the chord of the first and second non-joint zones between which the joint is positioned so as to increase the second moment of inertia in the area of the joint;
   wherein the first joint zone of the first blade section defines a distal zone relative to a hub of the wind turbine blade, and the second joint zone of the second blade section defines a proximal zone relative to the hub of the wind turbine blade;
   wherein the width of the chord in the area of the distal zone increases in a direction of the hub of the wind turbine blade;
   wherein the width of the chord in the area of the first and second non-joint zones increases in the direction of the hub of the wind turbine blade; and
   wherein the width of the chord in the area of the proximal zone decreases in the direction of the hub of the wind turbine blade.

* * * * *